S. BRITT.
Post-Socket.

No. 206,531.   Patented July 30, 1878.

Attest
Geo. H. Graham
B. Bloomfield Little

Inventor;
Stephen Britt,
by Chas. N. Forbes
Atty.

N. PETERS, PHOTO-LITHOGRAPHER, WASHINGTON, D. C.

UNITED STATES PATENT OFFICE.

STEPHEN BRITT, OF BROOKLYN, NEW YORK.

IMPROVEMENT IN POST-SOCKETS.

Specification forming part of Letters Patent No. 206,531, dated July 30, 1878; application filed June 12, 1878.

*To all whom it may concern:*

Be it known that I, STEPHEN BRITT, of the city of Brooklyn, in the county of Kings and State of New York, have invented a new and useful Improvement in Post-Sockets; and I do hereby declare that the following is a full, clear, and exact description of the same, reference being had to the accompanying drawing, forming a part of this specification, in which—

Figure 1:
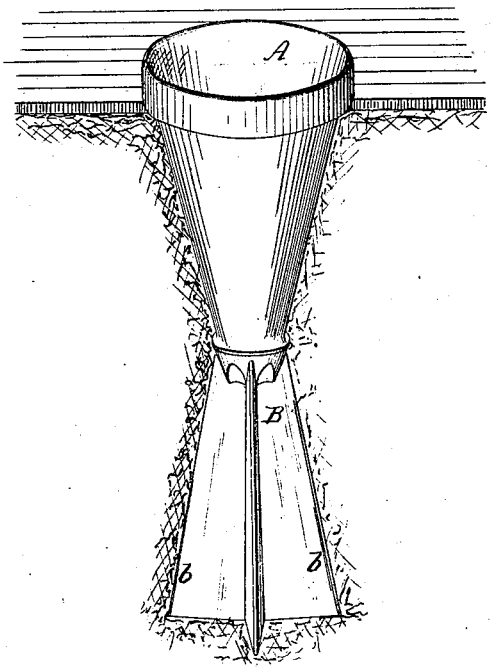
Figure 2:
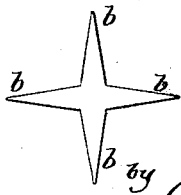

Figure 1 represents a perspective view of the device, and Fig. 2 a plan or cross-section of the base.

The object of this invention is to furnish a firm and imperishable base-socket for the support of wooden posts that are usually embedded in the ground, such as telegraph-poles, fence-posts, &c.; and the invention consists in the construction of a metallic socket for the purpose mentioned, as hereinafter fully described and claimed.

In the drawing, A represents the socket portion of the device, for the reception of the end of a post, and is made in the form of an inverted cone, as shown. B represents the lower portion of the device, forming an extension of the socket A, and of about equal length. The socket A may be made of circular, square, or triangular shape in cross-section, as may be found necessary or desirable, and an external flange may be provided near its upper edge, as shown, to rest upon a slab or other surface forming a street pavement, and assist in preventing a sinking or displacement of the device.

The lower portion, B, of the device is to be embedded in the ground, and is formed with outwardly-flaring wings $b\ b$, which serve to brace the device upright, and also prevent its turning, the dirt or other material surrounding the same being firmly packed within the intermediate V-shaped spaces. The length and diameter of the device may be of such dimensions as the nature of its service requires, and it may be set in stone-masonry, cement, or in any manner to securely anchor it in place. It is preferably composed of cast-iron; but other material, such as composition metal, may be used in its manufacture.

The post may be secured, if necessary, within the socket by any suitable means, a preservative cement being well adapted for such purpose.

This device, owing to the form adopted, can be conveniently cast in a single piece to reduce its original cost, and its utility in protecting the post from decay and maintaining it in position is manifest.

Having thus fully described my invention, what I claim, and desire to secure by Letters Patent, is—

A base-socket, A, for supporting an upright post, such as telegraph-poles, fence-posts, &c., provided with an extension, B, constructed of the outwardly-flaring wings $b\ b$, substantially as and for the purpose specified.

STEPHEN BRITT.

Witnesses:
L. W. SLOAT,
CHAS. W. FORBES.